United States Patent [19]
Hahn et al.

[11] Patent Number: 6,011,415
[45] Date of Patent: Jan. 4, 2000

[54] SHOCK SENSOR CIRCUITRY AND METHOD FOR AMPLIFYING AN INPUT SIGNAL INCLUDING LEAKAGE CURRENTS

[75] Inventors: Dennis V. Hahn, Plano; Rolf Lagerquist, Dallas; William R. Krenik, Garland, all of Tex.

[73] Assignee: Texas Instruments Incorporated, Dallas, Tex.

[21] Appl. No.: 08/919,992

[22] Filed: Aug. 28, 1997

[51] Int. Cl.[7] .............................. H03F 3/04; H01H 35/14
[52] U.S. Cl. .................. 327/103; 327/516; 327/561; 330/288; 360/75
[58] Field of Search .................... 327/53, 54, 62, 327/65, 66, 67, 74, 103, 516, 551, 561; 330/288; 360/75, 75 H

[56] References Cited

U.S. PATENT DOCUMENTS

| | | | |
|---|---|---|---|
| 4,742,338 | 5/1988 | Baxendale | 340/566 |
| 4,992,756 | 2/1991 | Anderson | 330/253 |
| 5,194,965 | 3/1993 | Quan et al. | 360/60 |
| 5,220,287 | 6/1993 | Astridge | 330/132 |
| 5,396,118 | 3/1995 | Yaguchi | 327/516 |
| 5,673,002 | 9/1997 | Kobayashi et al. | 330/288 |
| 5,784,742 | 7/1998 | Giuliani et al. | 15/22.1 |
| 5,821,745 | 10/1998 | Makino et al. | 327/516 |

*Primary Examiner*—Timothy P. Callahan
*Assistant Examiner*—Terry L. Englund
*Attorney, Agent, or Firm*—W. Daniel Swayze, Jr.; Wade James Brady, III; Richard L. Donaldson

[57] ABSTRACT

A shock sensor circuitry (26) is provided for processing an input signal generated by a shock sensor (28) in response to the shock sensor (28) detecting a force or shock. The shock sensor circuitry (26) includes a leakage tolerant input amplifier (38) for receiving the input signal, and any leakage currents that may also be provided, and amplifying the input signal to generate an amplified input signal. The leakage tolerant input amplifier (38) provides an ac gain of ten and a dc gain of zero. The shock sensor circuitry (26) also includes a filter and amplification circuit and a window comparator. The filter and amplification circuit filters the amplified input signal and amplifies select frequencies of the amplified input signal to generate a summed signal that is provided to the window comparator and compared to a reference value. The window comparator includes an upper comparator (58), a lower comparator (60), and an output circuit (62) to generate a shock sensor circuitry output signal that indicates whether a shock or force was received at a magnitude greater than the reference value.

30 Claims, 2 Drawing Sheets

SHOCK SENSOR CIRCUITRY AND METHOD FOR AMPLIFYING AN INPUT SIGNAL INCLUDING LEAKAGE CURRENTS

TECHNICAL FIELD OF THE INVENTION

This invention relates generally to the field of electronic circuitry and more particularly to a shock sensor circuitry including a leakage tolerant input amplifier and a method for amplifying an input signal including leakage currents.

BACKGROUND OF THE INVENTION

Shock sensor circuitry may be used in electronic devices to detect the application of a shock or force to an electronic device. For example, the hard disk drives of portable electronic devices, such as laptop and notebook computers, may include shock sensor circuitry to detect the application of a force such as that caused by dropping or bumping the computer. If a great enough force is applied, usually greater than one G, a hard disk drive may incorrectly write data during a write operation or incorrectly read data during a read operation. This results in data errors and sometimes system failure.

The shock sensor circuitry generally senses or detects the force and generates an output signal in response. As a result of generating the output signal, an action may be taken to prevent or minimize problems caused by the force. For example, the shock sensor circuitry of a hard disk drive may generate a signal to temporarily suspend a write operation or read operation to eliminate or minimize any adverse effects that may be caused by the force.

The shock sensor circuitry receives and processes an input signal generated by a shock sensor. The shock sensor is generally constructed from a piezoelectric material and has a high impedance. The shock sensor generates an input signal at a very low voltage that corresponds to the shock or force detected. The input signal must be amplified before it is processed by the shock sensor circuitry.

Problems arise when amplifying this low voltage input signal provided from the high impedance shock sensor. Specifically, direct current leakage currents are often present in addition to the input signal. These leakage currents are amplified, along with the input signal, by an input amplifier or input stage of the shock sensor circuitry resulting in an offset voltage that creates errors within the shock sensor circuitry. These errors may result in the generation of output signals indicating that a force was detected when none was present or the generation of an output signal indicating that no force was detected when one was present.

The leakage currents may be generated by a variety of sources and are present at some level in virtually all semiconductor junctions. Oftentimes, electrostatic discharge circuitry or structures are provided at the pins of an integrated circuit. The electrostatic discharge circuitry provides enhanced circuitry protection from electrostatic discharge which can destroy an integrated circuit. Integrated circuits using MOSFET technology are particularly susceptible to electrostatic discharge damage. As a consequence of providing the electrostatic discharge circuitry, a current path is provided resulting in increased leakage currents and decreased shock sensor circuitry performance. For example, a standard operational amplifier with an electrostatic discharge circuitry at its pins may draw a direct current leakage current of ten picoamps at room temperature and from one to ten nanoamps at 125° C. Leakage currents increase with an increase in temperature. Reliability suffers greatly if the electrostatic discharge circuitry must be removed to help reduce the leakage currents.

Other sources of leakage currents include current leakage from pin-to-pin across the plastic package of an integrated circuit and from the contamination present on most printed circuit boards. Printed circuit board contamination may include dust, particles, and any foreign or undesirable material on the printed circuit board that may provide a path for leakage currents. Contamination may result in leakage currents in the picoamp to nanoamp range, depending on the level of contamination. The contamination may only be eliminated or reduced by subjecting the printed circuit boards to additional cleaning processes that are both expensive and time consuming and significantly add to overall costs. Even if the contamination is initially removed, the printed circuit boards may later become contaminated resulting in increased leakage currents and decreased shock sensor circuitry performance.

SUMMARY OF THE INVENTION

From the foregoing it may be appreciated that a need has arisen for a shock sensor circuitry and method for amplifying an input signal including leakage currents to eliminate or reduce the problems associated with the leakage currents. In accordance with the present invention, a shock sensor circuitry and method for amplifying an input signal including leakage currents are provided.

According to the present invention, a shock sensor circuitry is provided for processing an input signal generated by a shock sensor in response to the shock sensor detecting a force or shock. The shock sensor circuitry includes a leakage tolerant input amplifier having a direct current gain of around zero for receiving the input signal, and any leakage currents that may also be provided, and generating an amplified input signal. The shock sensor circuitry further includes a filter circuit for filtering the amplified input signal and amplifying select frequencies of the amplified input signal to generate a filtered signal that is provided to a comparator. The comparator compares the filtered signal to a reference value to determine if a shock or force with a magnitude greater than the reference value has been received. The comparator generates a shock sensor circuitry output signal in an enabled state if the filtered signal has a magnitude greater than the reference value.

According to another aspect of the present invention, a leakage tolerant input amplifier is provided for receiving an input signal and an offset signal, generated from a direct current leakage current, and for generating an amplified input signal in response that is provided at or near zero when the offset signal is provided at a constant level. The leakage tolerant input amplifier includes an amplifier, an output device, a first current mirror circuitry, and a second current mirror circuitry. The amplifier receives and amplifies the input signal received across its input terminals and the offset signal received at a non-inverting input terminal and generates an amplified signal at an output terminal. The output device receives the amplified signal and regulates a control current in response. The first current mirror circuitry receives a bias current and mirrors the bias current to the output device and to an output node. The second current mirror circuitry receives the control current from the output device and mirrors the control current to the output node. The output node provides the amplified input signal at a value corresponding to the difference between the bias current and the control current, and the output device regulates the control current to a level that is about equal to the bias current when the offset signal is provided at a constant value.

The present invention provides various technical advantages. A technical advantage of the present invention includes the ability to receive and tolerate leakage currents without suffering the problems caused by the resulting offset voltages generated in response to receiving the leakage currents. These problems include decreased shock sensor circuitry accuracy, errors, and system performance, such as decreased overall hard disk drive system performance. Another technical advantage of the present invention includes reduced overall shock sensor circuitry complexity due to the elimination or reduction of offset voltages generated in response to the leakage currents. These offset voltages are eliminated or reduced by the leakage tolerant input amplifier. Still another technical advantage includes the ability to use electrostatic discharge circuitry to increase overall shock sensor circuitry reliability and system reliability even though the electrostatic discharge circuitry may increase leakage currents. Yet another technical advantage of the present invention includes the ability to tolerate leakage currents generated due to contaminated or unclean printed circuit boards. Still another technical advantage includes decreased overall costs due to the elimination of the added steps and processes needed to clean contaminated printed circuit boards so as to eliminate or reduce the presence of leakage currents. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which.

DETAILED DESCRIPTION OF THE INVENTION

Figure 1:
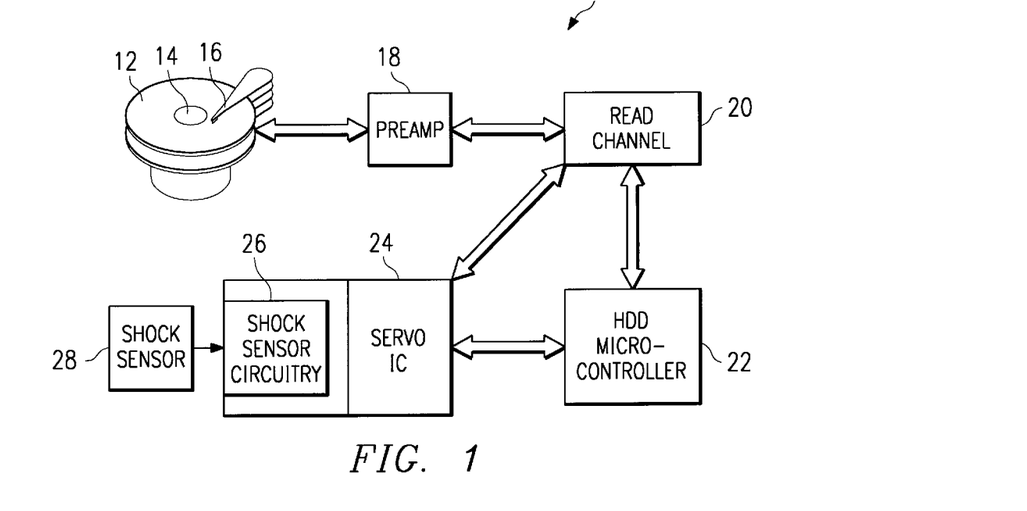
FIG. 1 is a block diagram illustrating a hard disk drive.

FIG. 1 is a block diagram illustrating a hard disk drive 10. Hard disk drive 10 includes a plurality of disk platters 12 for magnetically storing information, a spindle 14 for rotating plurality of disk platters 12, a set of read/write heads 16 for reading and writing information from and to plurality of disk platters 12, an actuator motor known as a voice coil motor (VCM) (not shown in FIG. 1) for positioning read/write heads 16 during read and write operations, and a spindle motor (also not shown in FIG. 1) for rotating spindle 14 to impart rotational motion to plurality of disk platters 12. Read/write heads 16 fly above the surface of each side of the platters of plurality of disk platters 12 and are mounted on actuator arms which are moved in unison by the VCM. Read/write heads 16 read data from a platter or disk of plurality of disk platters 12 by sensing the magnetic flux changes on the magnetic surface of the platters as it passes beneath a read/write head of read/write heads 16.

Hard disk drive 10 further includes a preamplifier 18, a read channel 20, a hard disk drive (HDD) microcontroller 22, a servo integrated circuit (IC) 24, and a shock sensor 28. Servo IC 24 may be implemented as either a servo controller or a servo driver. Preamplifier 18 is used to amplify analog data signals being provided between read channel 20 and read/write heads 16 during read and write operations. Read channel 20 processes the analog data signals and converts them from analog data signals to corresponding digital data signals during read operations. Read channel 20 converts digital data signals received from HDD microcontroller 22 to corresponding data signals during write operations. Read channel 20 exchanges the digital data signals with HDD microcontroller 22 and the analog data signals with preamplifier 18. Read channel 20 may also exchange control signals and servo information with servo IC 24. Servo IC 24 controls the speed of the spindle motor and the positioning of read/write heads 16 by controlling the VCM during read and write operations.

HDD microcontroller 22 provides overall control of hard disk drive 10 and controls the initiation of read and write operations. HDD microcontroller 22 allows data to be exchanged between hard disk drive 10 and a system bus, such as the system bus of a personal computer and may provide some digital signal processing capability. A random access memory, both static and dynamic, may also be provided for storing data and routines. HDD microcontroller 22 also interfaces with servo IC 24 to exchange control information. For example, a servo sensor circuitry 26 of servo IC 24 may provide a shock sensor circuitry output signal to HDD microcontroller 22 that indicates whether a shock or force above a reference threshold has been detected. The combined circuitry of shock sensor circuitry 26 and shock sensor 28 are used to generate the shock sensor circuitry output signal. If such a shock is detected, HDD microcontroller 22 may interrupt or delay a read or write operation to prevent a data error or system failure. HDD microcontroller 22 makes the decision whether to stop the read or write operation. For example, if the shock sensor circuitry output signal is provided in an enabled state over a given period of time, HDD microcontroller 22 may disable a write or read operation until the effect of the shock is reduced.

Shock sensor 28 may be implemented as a piezoelectric shock sensor with a high impedance. Shock sensor 28 generates an alternating current (ac) signal corresponding to the magnitude and direction of a detected shock or force. Leakage currents may also be provided to shock sensor circuitry 26 at the interface with shock sensor 28. These leakage currents often result in the generation of an offset voltage. Shock sensor circuitry 26 includes leakage tolerant input amplifier 38 (not shown in FIG. 1) that prevents the offset voltage from being amplified.

Figure 2:
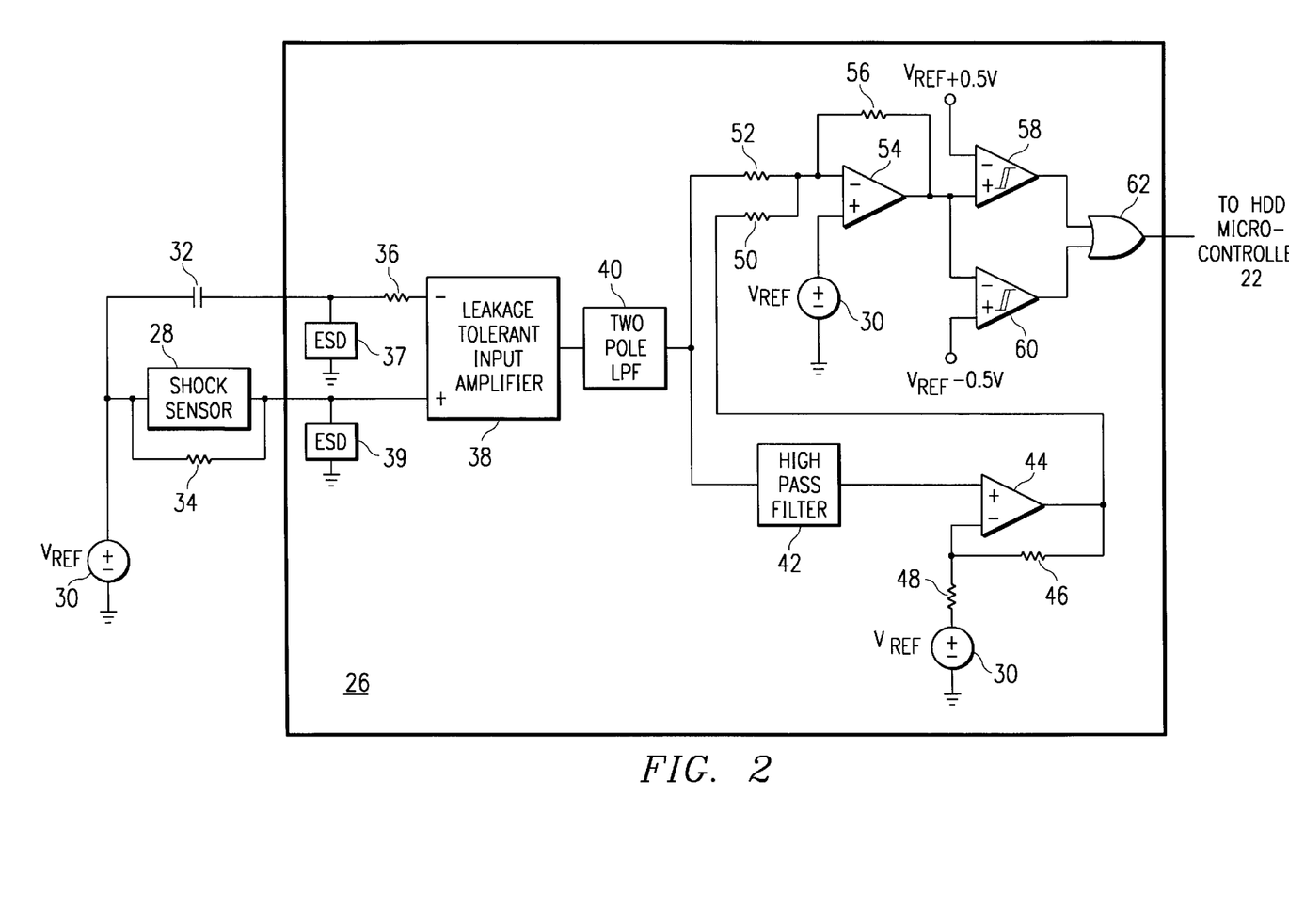
FIG. 2 is a circuit diagram illustrating a shock sensor circuitry of the hard disk drive.

FIG. 2 is a circuit diagram illustrating shock sensor circuitry 26 and shock sensor 28 of HDD 10. Shock sensor circuitry 26 receives an input signal from shock sensor 28, including any leakage currents that may be provided, and generates a shock sensor circuitry output signal that is provided to HDD microcontroller 22 for further processing and control of HDD 10. Shock sensor circuitry 26 may be implemented as an integrated circuit that is included as part of servo IC 24 and includes an electrostatic discharge circuitry (ESD) 37 and ESD 39 at its pins. ESD 37 and ESD 39 are designed to provide added protection from an electrostatic discharge. Shock sensor 28 will generally be implemented as a high impedance piezoelectric shock sensor that generates a low voltage signal having a spectrum of frequencies in response to the detection of an applied shock or force. The low voltage signal serves as the input signal to shock sensor circuitry 26 and will generally be provided as an alternating current (ac) signal having a magnitude and polarity related to the magnitude and direction or angle, respectively, of the detected shock. The shock sensor circuitry output signal indicates whether a shock or force has been detected having a magnitude greater than or equal to a predefined level.

A voltage reference 30 couples to both capacitor 32 and to a first terminal of shock sensor 28. Voltage reference 30 provides a bias voltage to shock sensor circuitry 26 and shock sensor 28. Capacitor 32 may be a 0.82 microfarad capacitor and is provided at the inverting input terminal of shock sensor circuitry 26 to block dc signals. A second terminal of shock sensor 28 couples to a non-inverting input terminal of shock sensor circuitry 26. A bias resistor 34 couples between the first and second terminal of shock sensor 28 to establish a bias voltage to the non-inverting input of leakage tolerant input amplifier 38. Bias resistor 34 may be provided as a forty-seven megaohm resistor. Capacitor 32 is provided at the inverting input terminal of shock sensor circuitry 26 to block any dc signal, such as a dc leakage current. As a result, the inverting input terminal of shock sensor circuitry 26 will only sense the ac portion of the input signal generated by shock sensor 28 while the non-inverting input terminal will sense the ac portion of the input signal and any dc leakage currents that may be provided through bias resistor 34.

Shock sensor circuitry 26 includes a leakage tolerant input amplifier 38, a two pole low pass filter 40, a high pass filter 42, a boost amplifier 44, a summing amplifier 54, an upper comparator 58, and a lower comparator 60. A resistor 36 couples between the inverting input terminal of shock sensor circuitry 26 and an inverting input terminal of leakage tolerant input amplifier 38. Resistor 36 may be provided as a twenty kiloohm. The non-inverting input terminal of shock sensor circuitry 26 couples directly to a non-inverting input terminal of leakage tolerant input amplifier 38. Leakage tolerant input amplifier 38 receives the input signal from shock sensor 28 at its terminals, along with any leakage currents at the non-inverting input terminal, and amplifies the ac portion of the input signal to generate an amplified input signal having a spectrum of frequencies. Leakage tolerant input amplifier 38 provides an ac gain of ten and a dc gain of around zero. The amplified input signal is then filtered, amplified, and summed by shock sensor circuitry 26 to generate a summed signal. The summed signal is then compared, using a window comparator, to a range of values defined by an upper and lower reference value to determine if the summed signal is inside or outside of the range.

Two pole low pass filter 40 receives and filters the amplified input signal provided by leakage tolerant input amplifier 38 to generate a filtered signal. Two pole low pass filter 40 removes high frequency noise and may be a continuous-time RC filter implemented using MOSFET circuitry that provides a 2 khz corner frequency with a −40 decibel/decade rolloff. Capacitor 32 and resistor 36 act as a high pass filter and provide the amplified input signal with a corner frequency. The corner frequency may be provided at around 10 hz with a +20 decibel/decade slope. Thus, at the output of the two pole low pass filter 40 a filtered signal is generated having corner frequencies at 10 hz and 2 khz with a +20 decibel/decade slope at 10 hz and a −40 decibel/decade rolloff at 2 khz.

A high pass filter 42 and a summing amplifier 54 receive and process the filtered signal from two pole low pass filter 40. High pass filter 42 filters the filtered signal and isolates a high frequency portion of the filtered signal which is then provided to boost amplifier 44 for amplification. High pass filter 42 may be implemented as a buffered, continuous-time RC filter implemented using MOSFET circuitry that provides a 1 khz corner frequency with a +20 decibel/decade slope. The high pass filtered signal is then provided to boost amplifier 44 for amplification.

Boost amplifier 44 receives the high pass filtered signal and amplifies the signal to generate an amplified high pass filtered signal. Boost amplifier 44 provides a gain of around twenty-five and may be configured using as an operational amplifier with feedback. The high pass filtered signal is provided to a non-inverting input terminal of boost amplifier 44 while feedback is provided to an inverting terminal through a feedback resistor 46. A resistor 48 couples between the inverting terminal and voltage reference 30.

Summing amplifier 54 receives the amplified high pass filtered signal at one input and the filtered signal at a second input. The amplified high pass filtered signal is received through a first summing resistor 50 coupled to a inverting input terminal of summing amplifier 54, and the filtered signal is received through a second summing resistor 52 also coupled to the inverting input terminal of summing amplifier 54. Summing amplifier 54 includes a feedback resistor 56 coupled between its output and inverting input terminal, and voltage reference 30 coupled to a non-inverting input terminal. Summing amplifier 54 receives these two signals and adds them together to generate a summed signal at its output. Summing amplifier 54 may be provided as a variable gain amplifier with a programmable gain. This may be accomplished by providing a digital signal to a serial port to select a desired resistance value of feedback resistor 56 to effect a desired gain of summing amplifier 54. Selection may be achieved by decode logic which selects various transmission gates that control the amount of resistance of feedback resistor 56.

The filtering and amplification of the amplified input signal provided by leakage tolerant input amplifier 38 is needed to extract and amplify information while ignoring input signal information that may provide erroneous information. For example, information provided at or near the frequency of the spindle motor or the motion of the voice coil motor will generally be filtered because of the increased risk of detecting the spindle motor or voice coil motor vibrations.

The summed signal is provided by summing amplifier 54 to an upper comparator 58 and a lower comparator 60 to determine if the summed signal is within or out of a range defined by an upper value and a lower value. Upper comparator 58 and lower comparator 60 are each comparators that generate a digital output signal in an enabled state when the value of the signal provided at their positive input terminal is greater than the value of the signal provided at their negative input terminal. The upper value may be equivalent to the sum of voltage reference 30 and 0.5 volts while the lower value may be equivalent to the sum of voltage reference 30 minus 0.5 volts. The upper value couples to the negative terminal of upper comparator 58 and the lower value couples to the positive terminal of lower comparator 60. The summed signal is provided to the positive terminal of upper comparator 58 and to the negative terminal of lower comparator 60.

Upper comparator 58 generates an upper shock sensor circuitry output signal in an enabled state when the summed signal is greater than the upper value, and the lower comparator 60 generates a lower shock sensor circuitry output signal in an enabled state when the summed signal is less than the lower value. An output circuit 62 receives the upper shock sensor circuitry output signal and the lower shock sensor circuitry output signal and generates a shock sensor circuitry output signal in response. Output circuit 62 may be implemented as an OR gate that generates the shock sensor circuitry output signal in an enabled state whenever either the upper shock sensor circuitry output signal or the lower shock sensor circuitry output signal are provided in an enabled state.

During steady state operation before a shock is detected and a corresponding input signal is generated by shock sensor 28, the input signals provided to shock sensor 28, and hence leakage tolerant input amplifier 38, are equivalent and the corresponding amplified input signal generated by leakage tolerant input amplifier 38 is zero. If a leakage current is present during this time, the leakage current will be provided through bias resistor 34 to the non-inverting input terminal of shock sensor circuitry 26. Leakage tolerant input amplifier 38 will ignore the leakage current and any offset voltage caused by the leakage current when generating the corresponding amplified input signal. As a result, the shock sensor circuitry output signal is generated in an unenabled state.

Once a shock is detected, shock sensor 28 generates an ac input signal related to the magnitude and direction of the detected shock. The ac input signal is received at the terminals of leakage tolerant input amplifier 38, along with any leakage current provided to the non-inverting input terminal of leakage tolerant input amplifier 38, and a corresponding amplified input signal is generated by applying an ac gain of ten and a dc gain of zero. The amplified input signal is then filtered, amplified, and summed by the combination of two pole low pass filter 40, high pass filter 42, boost amplifier 44, and summing amplifier 54 as described above. The summed signal is then provided to upper comparator 58 and lower comparator 60 so that output circuit 62 may generate the shock sensor circuitry output signal in an enabled state when the summed signal is generated outside of the upper value and lower value. HDD microcontroller 22 may receive the shock sensor circuitry output signal and take any appropriate action such as suspending a read or write operation to minimize or eliminate any potential data errors.

Although FIG. 2 illustrates a single shock sensor and associated shock sensor circuitry, multiple shock sensors and associated shock sensor circuitries may be provided and arranged to detect forces from different directions. Each shock sensor may be positioned to detect forces from different directions. For example, three shock sensors and accompanying shock sensor circuitries may be provided and arranged to detect forces applied in three dimensions such as an x, y, and z direction.

Figure 3:
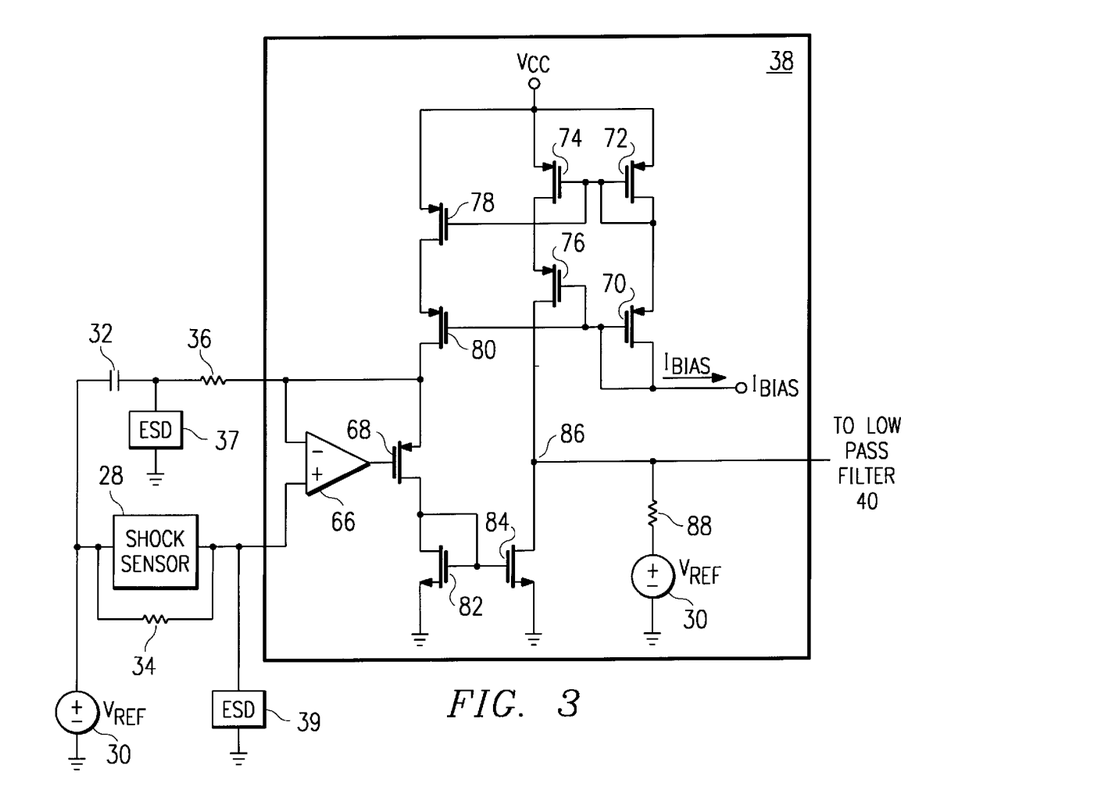
FIG. 3 is a circuit diagram illustrating a leakage tolerant input amplifier of the shock sensor circuitry.

FIG. 3 is a circuit diagram illustrating a leakage tolerant input amplifier 38 of shock sensor circuitry 26. Leakage tolerant input amplifier 38 receives an ac input signal generated by shock sensor 28 across a non-inverting input terminal and an inverting input terminal as illustrated in FIG. 2 and as discussed above. Leakage tolerant input amplifier 38 also receives any leakage currents that may be provided from any of a variety of sources at its non-inverting input terminal as provided through bias resistor 34. Leakage tolerant input amplifier 38 receives the input signal from shock sensor 28 and generates an amplified input signal in response. The amplified input signal is provided without any offset voltage that may have been generated due to the input leakage currents.

ESD 37 and ESD 39 are provided at the input pins of leakage tolerant input amplifier 38, assuming that leakage tolerant input amplifier 38 is implemented as an integrated circuit, and are designed to provide added protection from an electrostatic discharge. ESD 39 may provide a path for dc leakage currents to be provided such that a dc offset voltage is generated across bias resistor 34. Capacitor 32 should eliminate or reduce any leakage currents provided to the inverting terminal of leakage tolerant input amplifier 38.

Leakage tolerant input amplifier 38 includes a standard operational amplifier (op amp) 66 and a variety of field-effect transistor (FET) devices. The FET devices are used to regulate and mirror various currents such as a bias current $I_{BIAS}$. $I_{BIAS}$ is provided from circuitry external to leakage tolerant input amplifier 38 and is provided as a dc current at, for example, ten microamps.

Many of the FET devices are arranged as transistor pairs with the same or similar channel dimensions for accurate current mirroring. For example, the drain of a FET 72 is coupled to the source of a FET 70 to provide a cascoded transistor pair so that the $I_{BIAS}$ current provided through FET 72 and FET 70 may be mirrored to the transistor pairs that include a FET 74 and a FET 76, and a FET 78 and a FET 80. The transistor pairs of FET 74 and FET 76, and FET 78 and FET 80 are also configured in a cascode configuration so that $I_{BIAS}$ may be more accurately mirrored through these transistor pairs. FET 72, FET 74, and FET 78 all include the same or similar channel dimensions while FET 70, FET 76, and FET 80 all include the same or similar channel dimensions.

The combination of FET 70, FET 72, FET 74, FET 76, FET 78, and FET 80 may be referred to as a first current mirror circuitry for receiving the current $I_{BIAS}$ and mirroring this current to an output FET 68 and a FET 84. In the embodiment of the first current mirror circuitry shown in FIG. 2, all of the FET devices are implemented as p-channel FETs. The gates of FET 72, FET 74, and FET 78 are coupled together while the gate and drain of FET 72 are coupled to ensure that the $I_{BIAS}$ current being provided through FET 72 is mirrored through FET 74 and FET 78. A supply voltage $V_{CC}$ is provided at the source of FET's 72, 74, and 78. Thus, the first current mirror circuitry mirrors the current $I_{BIAS}$ through an output FET 68 and master FET 82 while also mirroring the current $I_{BIAS}$ through FET 84. As a result, the voltage at output node 86 is equivalent to the voltage between the drain of FET 80 and the source of output FET 68 when $I_{BIAS}$ is being provided in the manner just described.

The gate of output FET 68 couples to the output terminal of standard op amp 66 and the source of output FET 68 couples to the inverting input terminal of standard op amp 66. This connection enables output FET 68, as controlled by the output of standard op amp 66, to control or regulate the amount of current flowing through output FET 68. When a dc offset voltage is provided at the non-inverting input of standard op amp 66 due to the presence of a dc leakage current provided through bias resistor 34, the offset voltage is amplified and reflected as an amplified signal at the gate of output FET 68. In response, the source of output FET 68 is changed an amount so that the voltage $V_{GS}$ is established at a level that allows $I_{BIAS}$ to continue to flow through output FET 68. The feedback connection from the source of output FET 68 and the inverting input of standard op amp 66 acts similar to an open circuit during this state. This results in $I_{BIAS}$ flowing through output FET 68.

When shock sensor 28 provides an ac input signal across the input terminals of standard op amp 66, the amplified output of standard op amp 66 changes with the input signal and the current being provided through output FET 68 changes accordingly to provide a control current through output FET 68. This occurs due to the changing voltage $V_{GS}$ of output FET 68. The current that is equal to difference between the control current and $I_{BIAS}$ is provided through the feedback connection between the source of output FET 68 to the inverting input of standard op amp 66. Any dc offset voltage provided at the non-inverting input of standard op amp 66 will also be provided to the non-inverting input and thus will not be reflected at the output terminal of standard op amp 66.

A second current mirror circuitry is implemented as a transistor pair of a FET 82 and a FET 84. FET 82 serves as the master and mirrors the control current being provided from output FET 68 to FET 84. As such, output node 86 receives the current $I_{BIAS}$ from FET 76 and the control current from FET 84 and a difference current is provided through a resistor 88 to generate the amplified input voltage.

Thus, when only a dc offset voltage is provided at the non-inverting input terminal, the control current is equal to $I_{BIAS}$ and the difference current is equal to zero. This results in little or no current flowing through resistor 88, and hence, the amplified input signal is equal to voltage reference 30. When an ac input signal is provided from shock sensor 28 at the input terminals of standard op amp 66, the control current is not equal to $I_{BIAS}$ resulting in a difference current being provided across resistor 88. This voltage and voltage reference 30 serve as the amplified input signal. The amplified input signal serves as the output of leakage tolerant input amplifier 38 and is provided to two pole low pass filter 40.

Leakage tolerant input amplifier 38 can receive a dc leakage current up to, for example from one to 10 nanoamps at a pin, without generating an offset voltage at the output of leakage tolerant input amplifier 38. Thus, leakage tolerant input amplifier 38 eliminates the amplification of a dc offset voltage which prevents the problems associated with a dc offset voltage generated by the presence of dc leakage currents.

Thus, it is apparent that there has been provided, in accordance with the present invention, a shock sensor circuitry and method for amplifying an input signal including leakage currents that satisfy the advantages set forth above. Although the preferred embodiment has been described in detail, it should be understood that various changes, substitutions, and alterations can be made herein without departing from the scope of the present invention. For example, although the present invention has been illustrated and described as being implemented using FET or field effect transistor technology, it should be understood that the present invention is not so limited. The present invention may be implemented by one of ordinary skill in the art using a variety of other technologies such as bipolar junction transistor technology. The circuits described and illustrated in the preferred embodiment as discrete or separate circuits may be combined into one circuit or split into separate circuits without departing from the scope of the present invention. Furthermore, the direct connections illustrated herein could be altered by one skilled in the art such that two devices are merely coupled to one another through an intermediate device or devices without being directly connected while still achieving the desired results demonstrated by the present invention. Other examples of changes, substitutions, and alterations are readily ascertainable by one skilled in the art and could be made without departing from the spirit and scope of the present invention as defined by the following claims.

We claim:

1. A leakage tolerant input amplifier for receiving a first input signal and an offset signal, the offset signal generated from a direct current leakage current, and for generating an amplified input signal in response to receiving the first input signal, the leakage tolerant input amplifier comprising:

an amplifier having a non-inverting input terminal, an inverting input terminal, and an output terminal, the amplifier operable to receive and amplify the first input signal received across its input terminals and the offset signal received at the non-inverting input terminal to generate an amplified signal at the output terminal;

an output device operable to receive the amplified signal from the output terminal and to regulate a control current in response;

a first current mirror circuitry operable to receive a bias current and to mirror the bias current to the output device and to an output node; and a second current mirror circuitry operable to receive the control current from the output device and to mirror the control current to the output node, and wherein the output node provides the amplified input signal at a value corresponding to the difference between the bias current and the control current, and the output device is operable to regulate the control current to a level that is about equal to the bias current when the offset signal is provided at a constant value.

2. The leakage tolerant input amplifier of claim 1, wherein the amplifier is an operational amplifier and the inverting input terminal is coupled to the output device.

3. The leakage tolerant input amplifier of claim 2, wherein the output device is a field-effect transistor having a gate coupled to the output terminal, a source coupled to the inverting input terminal and the first current mirror circuitry, and a drain coupled to the second current mirror circuitry.

4. The leakage tolerant input amplifier of claim 2, wherein the output device is a field-effect transistor having a gate controlled by the amplified signal, a source operable to receive the bias current mirrored from the first current mirror circuitry and to provide feedback to the inverting input terminal, and a drain operable to provide the control current to the second current mirror circuitry.

5. The leakage tolerant input amplifier of claim 1, further comprising:

an output resistor coupled between the output node and a voltage reference, the output resistor operable to receive an output current from the output node that is the difference between the bias current and the control current and to generate the amplified input signal in response.

6. The leakage tolerant input amplifier of claim 5, wherein the voltage reference is ground.

7. The leakage tolerant input amplifier of claim 1, has an ac gain of ten and a dc gain of around zero.

8. The leakage tolerant input amplifier of claim 1, wherein the bias current is a direct current bias current.

9. The leakage tolerant input amplifier of claim 1, wherein the leakage tolerant input amplifier is provided in an integrated circuit package and further comprises:

an electrostatic discharge circuitry coupled to an input pin of the integrated circuit package.

10. The leakage tolerant input amplifier of claim 1, wherein the input signal is generated by a shock sensor in response to the shock sensor detecting a force.

11. The leakage tolerant input amplifier of claim 10, wherein the shock sensor is a piezoelectric sensor operable to generate the input signal at a voltage level corresponding to the magnitude of the detected force.

12. The leakage tolerant input amplifier of claim 11, wherein the input signal is generated between a first terminal and a second terminal of the shock sensor, and the input signal is provided to the amplifier across the inverting input terminal and the non-inverting input terminal.

13. The leakage tolerant input amplifier of claim 12, wherein a bias resistor is provided across the first terminal and the second terminal of the shock sensor, and a capacitor and a resistor are provided between the first terminal of the shock sensor and the inverting terminal of the amplifier.

14. The leakage tolerant input amplifier of claim 1, wherein the input signal is provided as a time varying signal.

15. A shock sensor circuitry for processing an input signal generated by a shock sensor in response to the shock sensor detecting a force, the shock sensor circuitry comprising:

a leakage tolerant input amplifier having a direct current gain of around zero and operable to receive the input signal including a leakage current and to generate an amplified input signal in response;

a filter circuit operable to receive the amplified input signal and to filter the amplified input signal to generate a filtered signal; and a comparator operable to compare the filtered signal to a reference value and to generate a shock sensor circuitry output signal in response, wherein the leakage tolerant input amplifier includes:

an amplifier having a non-inverting input terminal, an inverting input terminal, and an output terminal, the amplifier operable to receive and amplify the input signal, received across its input terminals, and an offset signal, generated by the leakage current of the input signal received at the non-inverting output terminal, and to generate an amplified signal at the output terminal in response;

an output device operable to receive the amplified signal from the output terminal and to regulate a control current in response;

a first current mirror circuitry operable to receive a bias current and to mirror the bias current to the output device and to an output node; and a second current mirror circuitry operable to receive the control current from the output device and to mirror the control current to the output node, and wherein the output node provides the amplified input signal at a value corresponding to the difference between the bias current and the control current.

16. The shock sensor circuitry of claim 15, wherein the amplifier is an operational amplifier and the inverting input terminal couples to the output device.

17. A shock sensor circuitry for processing an input signal generated by a shock sensor in response to the shock sensor detecting a force, the shock sensor circuitry comprising:

a leakage tolerant input amplifier having a direct current gain of around zero and operable to receive the input signal including a leakage current and to generate an amplified input signal in response;

a filter circuit operable to receive the amplified input signal and to filter the amplified input signal to generate a filtered signal; and a comparator operable to compare the filtered signal to a reference value and to generate a shock sensor circuitry output signal in response, wherein the comparator is a window comparator operable to compare the filtered signal to an upper reference value and a lower reference value, the window comparator operable to generate the shock sensor circuitry output signal in an enabled state if the filtered signal is greater than the upper reference value or less than the lower reference value.

18. The shock sensor circuitry of claim 17, wherein the window comparator includes an upper comparator operable to compare the filtered signal to the upper reference value and to generate an upper shock sensor circuitry output signal in the enabled state if the filtered signal is greater than the upper reference value, a lower comparator operable to compare the filtered signal to the lower reference value and to generate a lower shock sensor circuitry output signal in the enabled state if the filtered signal is less than the lower reference value, and an output circuit operable to enable the shock sensor circuitry output signal if either the upper shock sensor circuitry output signal or the lower shock sensor circuitry output signal is provided in the enabled state.

19. A shock sensor circuitry for processing an input signal generated by a shock sensor in response to the shock sensor detecting a force, the shock sensor circuitry comprising:

a leakage tolerant input amplifier having a direct current gain of around zero and operable to receive the input signal including a leakage current and to generate an amplified input signal in response;

a filter circuit operable to receive the amplified input signal and to filter the amplified input signal to generate a filtered signal; and a comparator operable to compare the filtered signal to a reference value and to generate a shock sensor circuitry output signal in response, wherein the filter circuit includes a second order low pass filter and a high pass filter.

20. The shock sensor circuitry of claim 19, wherein the second order low pass filter is operable to receive and process the amplified input signal and to generate a low pass filtered signal in response;

the high pass filter operable is receive and process the low pass filtered signal and to generate a high pass filtered signal in response; and the filter circuit further includes a summing amplifier operable to add the low pass filtered signal and the high pass filtered signal and to generate the filtered signal in response.

21. The shock sensor circuitry of claim 20, wherein the filter circuit further includes:

a boost amplifier operable to receive and amplify the high pass filtered signal and to generate an amplified high pass filtered signal in response, and wherein the amplified high pass filtered signal is provided to the summing amplifier along with the low pass filtered signal.

22. The shock sensor circuitry of claim 20, wherein the summing amplifier is a variable gain amplifier with a programmable gain.

23. A shock sensor circuitry for processing an input signal generated by a shock sensor in response to the shock sensor detecting a force, the shock sensor circuitry comprising:

a leakage tolerant input amplifier having a direct current gain of around zero and operable to receive the input signal including a leakage current and to generate an amplified input signal in response;

a filter circuit operable to receive the amplified input signal and to filter the amplified input signal to generate a filtered signal; and a comparator operable to compare the filtered signal to a reference value and to generate a shock sensor circuitry output signal in response, wherein the input signal is generated by a first shock sensor in response to the first shock sensor detecting a force in a first direction, and a second input signal is generated by a second shock sensor in response to the second shock sensor detecting a force in a second direction, and further comprising:

a second leakage tolerant input amplifier operable to receive the second input signal including a second leakage current and to generate a second amplified input signal in response, the second amplified input signal having a direct current gain of around zero;

a second filter circuit operable to receive the second amplified input signal and to filter the second amplified input signal to generate a second filtered signal; and a second comparator operable to compare the second filtered signal to a second reference value and to generate a second shock sensor circuitry output signal in response.

24. The shock sensor circuitry of claim 23, wherein a third input signal is generated by a third shock sensor in response to the third shock sensor detecting a force in a third direction, and further comprising:

a third leakage tolerant input amplifier operable to receive the third input signal including a third leakage current and to generate a third amplified input signal in response, the third amplified input signal having a direct current gain of around zero;

a third filter circuit operable to receive the third amplified input signal and to filter the third amplified input signal to generate a third filtered signal; and a third comparator operable to compare the third filtered signal to a third reference value and to generate a third shock sensor circuitry output signal in response.

25. A shock sensor circuitry for processing an input signal generated by a shock sensor in response to the shock sensor detecting a force, the shock sensor circuitry comprising:

a leakage tolerant input amplifier having a direct current gain of around zero and operable to receive the input signal including a leakage current and to generate an amplified input signal in response;

a filter circuit operable to receive the amplified input signal and to filter the amplified input signal to generate a filtered signal; and a comparator operable to compare the filtered signal to a reference value and to generate a shock sensor circuitry output signal in response, wherein the input signal is generated between a first terminal and a second terminal of the shock sensor, and the input signal is provided to the leakage tolerant input amplifier across an inverting input terminal and a non-inverting input terminal of the leakage tolerant input amplifier.

26. The shock sensor circuitry of claim 25, wherein a bias resistor is provided across the first terminal and the second terminal of the shock sensor, and a capacitor and a resistor are provided between the first terminal of the shock sensor and the inverting terminal of the leakage tolerant input amplifier.

27. A shock sensor circuitry for processing an input signal generated by a shock sensor in response to the shock sensor detecting a force, the shock sensor circuitry comprising:

a leakage tolerant input amplifier having a direct current gain of around zero and operable to receive the input signal including a leakage current and to generate an amplified input signal in response;

a filter circuit operable to receive the amplified input signal and to filter the amplified input signal to generate a filtered signal; and a comparator operable to compare the filtered signal to a reference value and to generate a shock sensor circuitry output signal in response, wherein the leakage tolerant input amplifier receives the leakage current in the form of an offset voltage generated by providing the leakage current through a bias resistor.

28. A method for amplifying a first input signal and an offset signal, the offset signal generated from a direct current leakage current, to generate an amplified input signal with a direct current gain of about zero, the method comprising the steps of:

receiving the first input signal and the offset signal generated from the direct current leakage current;

amplifying the input signal and the offset signal with an operational amplifier circuitry to generate an amplified signal at an output terminal with the direct current gain and an alternating current gain;

providing the amplified signal to an output device coupled to the output terminal of the operational amplifier circuitry;

mirroring a bias current to the output device and to an output node;

regulating a control current in response to receiving the amplified signal and the bias current;

mirroring the control current to the output node; and generating the amplified input signal at an amplified value corresponding to the difference between the bias current and the control current as provided at the output node such that the amplified input signal is generated at or near zero when the offset signal is provided at a constant value.

29. The method of claim 28, wherein the input signal is provided from a piezoelectric shock sensor.

30. The method of claim 28, wherein the output device is a field-effect transistor.

* * * * *

UNITED STATES PATENT AND TRADEMARK OFFICE
CERTIFICATE OF CORRECTION

PATENT NO. : 6,011,415
DATED : January 4, 2000
INVENTOR(S) : Dennis V. Hahn, Rolf Lagerquist, William R. Krenik It is certified that error appears in the above-identified patent and that said Letters Patent is hereby corrected as shown below:

Title page of this Patent:
Please insert the following after "Related U.S. Application Data":

Provisional application No. 60/029,451 October 21, 1996

Signed and Sealed this

Seventh Day of August, 2001

*Attest:*

*Attesting Officer*

NICHOLAS P. GODICI
*Acting Director of the United States Patent and Trademark Office*

United States Patent [19]
Hahn et al.

[11] Patent Number: 6,011,415
[45] Date of Patent: Jan. 4, 2000

[54] SHOCK SENSOR CIRCUITRY AND METHOD FOR AMPLIFYING AN INPUT SIGNAL INCLUDING LEAKAGE CURRENTS

[75] Inventors: Dennis V. Hahn, Plano; Rolf Lagerquist, Dallas; William R. Krenik, Garland, all of Tex.

[73] Assignee: Texas Instruments Incorporated, Dallas, Tex.

[21] Appl. No.: 08/919,992

[22] Filed: Aug. 28, 1997

[51] Int. Cl.[7] .................... H03F 3/04; H01H 35/14
[52] U.S. Cl. .................... 327/103; 327/516; 327/561; 330/288; 360/75
[58] Field of Search .................... 327/53, 54, 62, 327/65, 66, 67, 74, 103, 516, 551, 561; 330/288; 360/75, 75 H

[56] References Cited

U.S. PATENT DOCUMENTS

| | | | |
|---|---|---|---|
| 4,742,338 | 5/1988 | Baxendale | 340/566 |
| 4,992,756 | 2/1991 | Anderson | 330/253 |
| 5,194,965 | 3/1993 | Quan et al. | 360/60 |
| 5,220,287 | 6/1993 | Astridge | 330/132 |
| 5,396,118 | 3/1995 | Yaguchi | 327/516 |
| 5,673,002 | 9/1997 | Kobayashi et al. | 330/288 |
| 5,784,742 | 7/1998 | Giuliani et al. | 15/22.1 |
| 5,821,745 | 10/1998 | Makino et al. | 327/516 |

*Primary Examiner*—Timothy P. Callahan
*Assistant Examiner*—Terry L. Englund
*Attorney, Agent, or Firm*—W. Daniel Swayze, Jr.; Wade James Brady, III; Richard L. Donaldson

[57] ABSTRACT

A shock sensor circuitry (26) is provided for processing an input signal generated by a shock sensor (28) in response to the shock sensor (28) detecting a force or shock. The shock sensor circuitry (26) includes a leakage tolerant input amplifier (38) for receiving the input signal, and any leakage currents that may also be provided, and amplifying the input signal to generate an amplified input signal. The leakage tolerant input amplifier (38) provides an ac gain of ten and a dc gain of zero. The shock sensor circuitry (26) also includes a filter and amplification circuit and a window comparator. The filter and amplification circuit filters the amplified input signal and amplifies select frequencies of the amplified input signal to generate a summed signal that is provided to the window comparator and compared to a reference value. The window comparator includes an upper comparator (58), a lower comparator (60), and an output circuit (62) to generate a shock sensor circuitry output signal that indicates whether a shock or force was received at a magnitude greater than the reference value.

30 Claims, 2 Drawing Sheets